United States Patent [19]

Moore

[11] Patent Number: 4,802,149
[45] Date of Patent: Jan. 31, 1989

[54] ACOUSTO-OPTIC TWO-DIMENSIONAL COHERENT OPTICAL MODULATOR

[75] Inventor: George S. Moore, Colorado Springs, Colo.

[73] Assignee: Harris Corp., Melbourne, Fla.

[21] Appl. No.: 943,171

[22] Filed: Dec. 18, 1986

[51] Int. Cl.$^4$ ................................................ G01J 9/68
[52] U.S. Cl. .................... 367/100; 342/108; 364/822
[58] Field of Search ............ 367/7, 64, 99, 100; 342/107, 108, 189, 196; 364/821, 822, 827; 350/3.82, 162.13

[56] References Cited

U.S. PATENT DOCUMENTS

| | | | |
|---|---|---|---|
| 4,225,938 | 9/1980 | Turpin | 364/822 |
| 4,531,197 | 7/1985 | Lin | 364/822 |

Primary Examiner—Thomas H. Tarcza
Assistant Examiner—Daniel T. Pihulic
Attorney, Agent, or Firm—Antonelli, Terry & Wands

[57] ABSTRACT

Outputs of a linear phased array antenna can be employed for emitter field sorting, i.e., providing an indication of the frequency and angle of arrival of signals from a plurality of radiation sources, through the use of a two-dimensional optical processor that does not require a mechanism for correcting for acoustic spreading in a multi-channel Bragg cell. In effect, the multi-channel array of transducers of a Bragg cell forms a composite N-channel transducer the width of which is N times the spacing between channels. For a CW radiation source, the signal received by each array element undergoes an incremental phase shift associated with the tilt of the phase front across the array. When these signals are used to drive respectively adjacent transducers of a multi-channel Bragg cell, the acoustic effect within the bulk is equivalent to that of driving a large composite transducer with a constant frequency signal. This larger size of the effective composite transducer provides significantly reduced divergence of the composite acoustic wave, while the linear phase shift across the transducer results in a tilting of the composite acoustic wave. The two-dimensional acoustic wave modulation of a light beam passing through the Bragg cell is then imaged in the transform plane of a downstream Fourier transform lens, so as to produce a two-dimensional Fourier transform of the Bragg cell. In the transform plane there is provided a frequency display in the horizontal (parallel to the direction of travel of acoustic waves in the Bragg cell) direction and an angle of arrival (azimuth angle) display in the vertical direction. Multiple radiation sources at different locations may be processed independently through superposition.

19 Claims, 7 Drawing Sheets

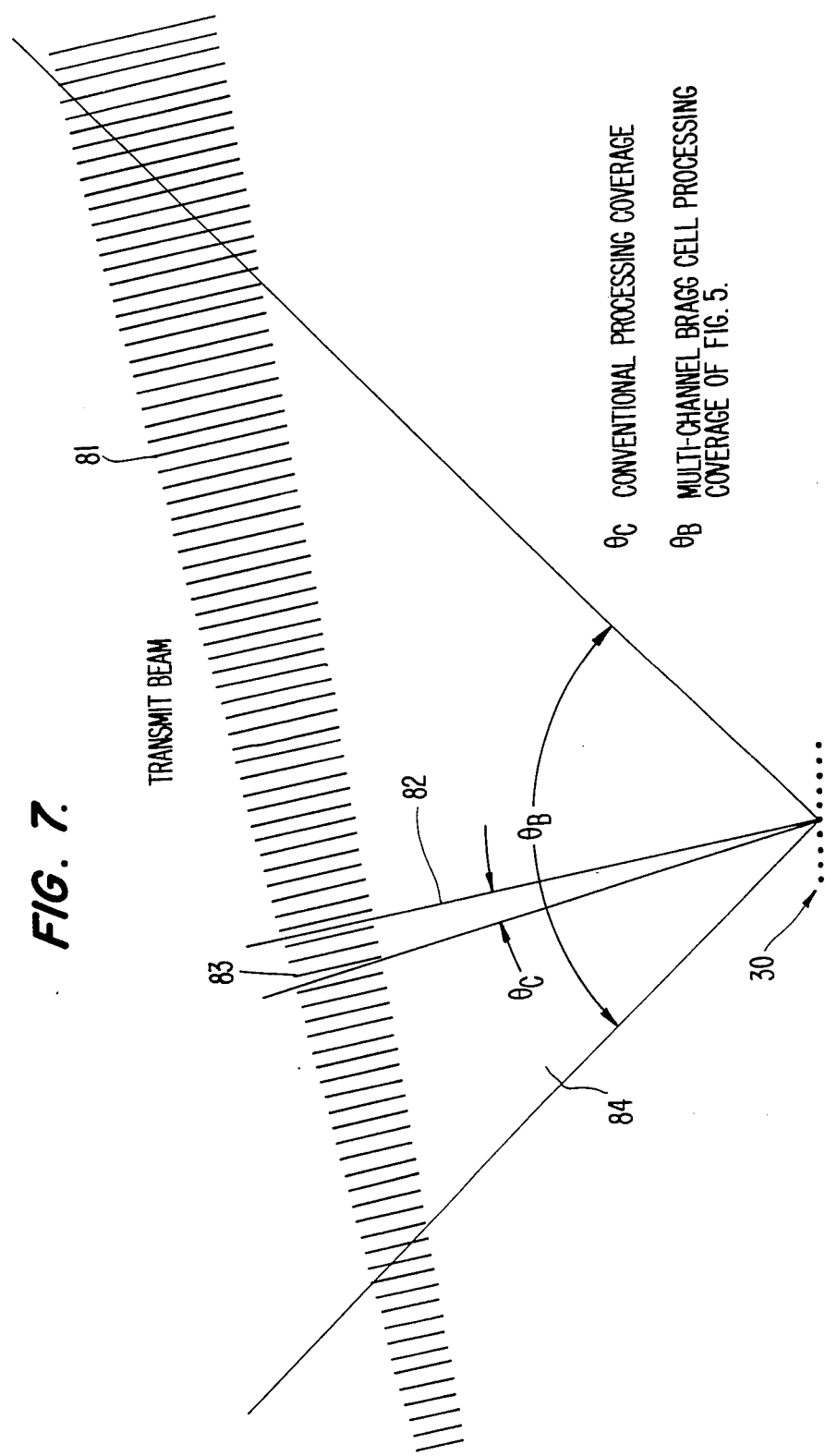

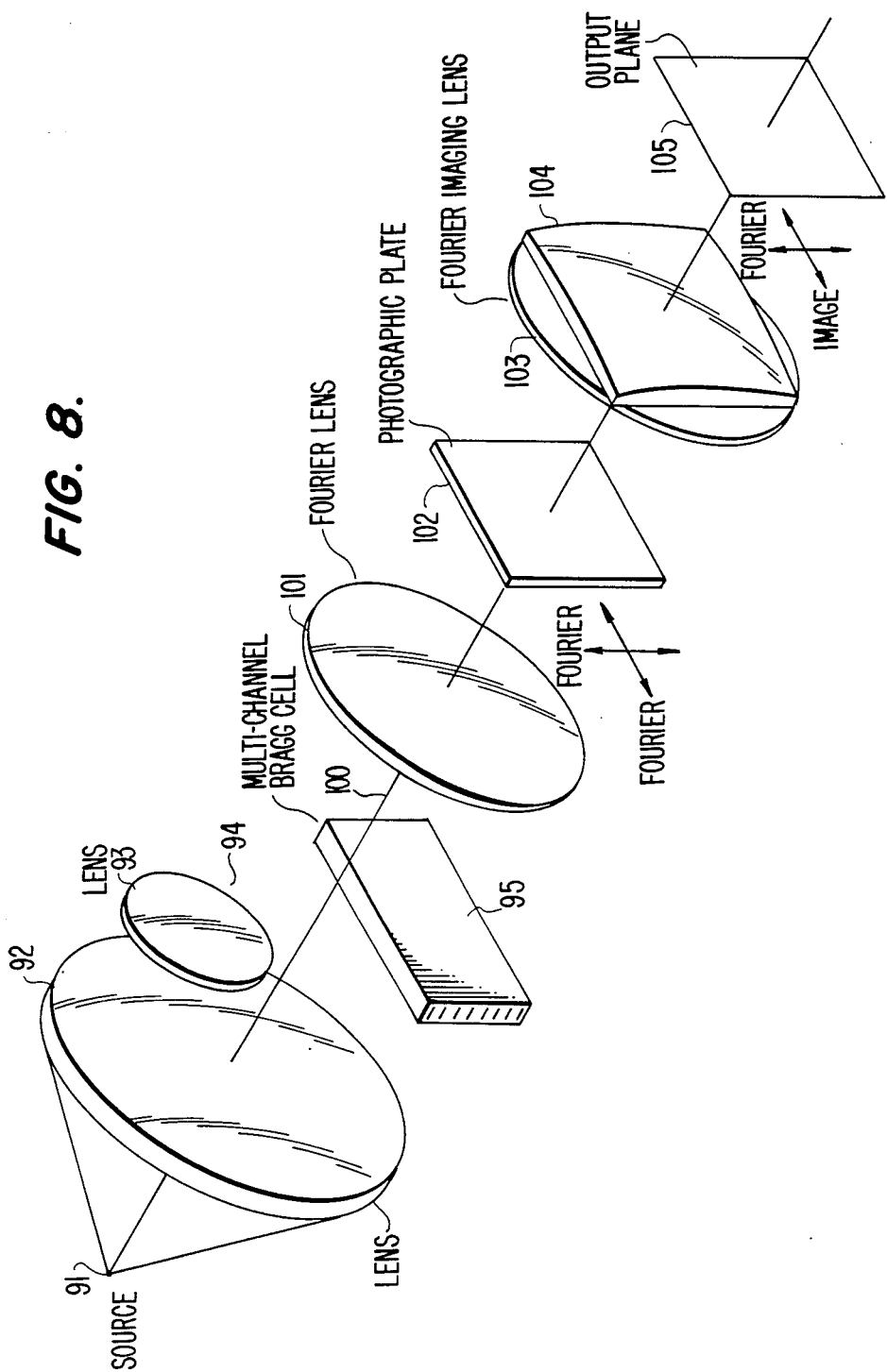

ACOUSTO-OPTIC TWO-DIMENSIONAL COHERENT OPTICAL MODULATOR

FIELD OF THE INVENTION

The present invention relates to optical signal processing and is particularly directed to a multi-channel Bragg cell processing scheme which is capable of executing two-dimensional signal processing without being subject to limitations imposed by acoustic spreading.

BACKGROUND OF THE INVENTION

Bragg cells have been used extensively as acousto-optic modulators in optical processing systems that operate on wide bandwidth (e.g. R.F.) signals. As an acousto-optic device, the Bragg cell operates to convert an electrical (wideband RF) signal into an optical signal and serves as a basic storage element of the optical signal processor. Among the various optical processing systems that have employed Bragg cells in carrying out computationally intensive operations are spectrum analyzers, correlators and ambiguity function generators.

Within the optical signal processor, the Bragg cell is typically used as a single channel device, in which a wideband signal is applied to a transducer mounted on one end of the bulk medium of the cell and an acoustic wave is launched into the bulk from the transducer As the acoustic wave propagates into the cell, it spatially modulates an impinging optical beam, which is then subjected to downstream optical processing. In addition to such single channel cell configurations, Bragg cells may also be driven as high performance multi-channel devices, such as very high bit rate optical recorders. Here, instead of a single transducer the Bragg cell has a plurality of transducers disposed adjacent to one another on one face of the bulk, to which the multiple bits of the information signal to be recorded are applied. In this application, only a single resolution element is typically stored within the bulk along the length of the cell (i.e. in the direction of propagation of the acoustic wave), so that the cell effectively operates in a one-dimensional (down the cell) linear array format.

In addition to these one-dimensional processing schemes, it would be desirable to process signals in a two-dimensional format. To use a Bragg cell for two-dimensional processing, it is necessary to store a significant portion of the time history of each signal to be processed along the length of the cell. Unfortunately, because of physical constraints on the size of system components, multi-channel Bragg cells typically employ transducers that are small and closely spaced, in order to provide a large number of channels on a small crystal. As a result, when the acoustic waves that are launched by the respective transducers of the cell propagate into the bulk from the face of the crystal on which the transducers are mounted, the waves expand or spread, similar to the diffraction pattern produced by an aperture antenna.

This spreading phenomenon is illustrated in FIG. 1, which shows a portion of a multi-channel Bragg cell 10 of length L on one face 11 of which are mounted a plurality of transducers 12, 13 and 14 associated with respective channels of the cell In response to the application of electrical signals, the transducers 12, 13, 14 launch into the Bragg cell 10 respective acoustic waves 22, 23, 24 which spread out as they propagate across the cell 10 and eventually overlap one another before reaching the other side of the cell. In the illustration of FIG. 1, acoustic wave 22 is shown as overlapping acoustic wave 23 in region 32, and acoustic wave 23 is shown as overlapping acoustic wave 24 at region 33. These regions of overlap 32 and 33 create interference in the signals to be processed (as the information is no longer in separate, discrete channels), so as to effectively reduce the useful length of the Bragg cell from its maximum available propagation length L to some lesser dimension L'. This reduction in the effective length of the Bragg cell consequently decreases the time-bandwidth product of each channel.

Reports of studies of this diffraction spreading phenomenon have indicated that, although the beams overlap, information in the phase front of each beam can be used to direct the beams into distinct channels. More particularly, as described in articles by A Vanderlugt et al, entitled "Multichannel Bragg Cells: compensation for acoustic spreading", Applied Optics, Vol. 22, No. 23, Dec. 1, 1983, pp 3906–3912 and "Acoustic spreading in multichannel Bragg cells" SPIE Vol 465, Spatial Light Modulators and Applications (1984) pp 152–155, and in a previous article by I.A. Vodovatov et al, Pis'ma Zh. Tekh Fiz 7, 369 (1981), [Sov. Tech. Phys. Lett. 7, 159 (1981)], p. 159 which is referenced in the Vanderlugt et al articles, maintaining distinctness among the multiple channels can be accomplished by using a holographic optical element created from one of the channels in the Bragg cell that is driven by a pure frequency. A reference beam, equally offset in frequency, may be used to capture the amplitude and phase information in a one-dimensional hologram. When this element is placed in the Fourier transform plane of a lens disposed downstream of the Bragg cell, the amplitude and phase for each channel is matched so that, in an image plane of the Bragg cell, each beam is distinct An illustration of the compensated cell is shown in FIG. 2. With this compensation, the signal applied to each transducer 16, 15, 14 of the cell 10 propagates as a nondiverging beam 22', 23', 24'.

Although the above described proposal provides compensation for acoustic spreading, because of the manner in which the optical energy is compressed, there may result a loss of the modulation transfer function which increases as a function of the distance from the transducer and therefore may affect subsequent optical processing.

SUMMARY OF THE INVENTION

Rather than use a spread correcting hologram, as described in the above-referenced literature, to provide compensation or correction in a two-dimensional optical modulator for the undesirable (and time-bandwidth product limiting) phenomenon of acoustic spreading, the present invention is premised upon the recognition that a particular class of signals is not subject to the above limitations; namely, those in which there is a high degree of correlation between the signals that are applied to the transducer for processing. One example of such signals are the outputs of the elements of a linear phased array antenna.

In accordance with a first embodiment of the present invention, the outputs of a linear phased array antenna can be employed for emitter field sorting, i e providing an indication of the frequency and angle of arrival of signals from a plurality of radiation sources, through the use of a two-dimensional optical processor that does not require a spread correction mechanism. In effect the multi-channel array of transducers of a Bragg cell forms a composite N-channel transducer the width of which is N times the spacing between channels For a CW radiation source, the signal received by each array element undergoes an incremental phase shift associated with the tilt of the phase front across the array. When these signals are used to drive respectively adjacent transducers of a multi-channel Bragg cell, the acoustic effect within the bulk is approximately equivalent to that of driving a large composite transducer with a constant frequency signal. This larger size of the effective composite transducer provides significantly reduced divergence of the composite acoustic wave, while the incrementally linear phase shift across the transducer results in a tilting of the composite acoustic wave.

The two-dimensional acoustic wave modulation of a light beam passing through the Bragg cell is then imaged in the transform plane of a downstream Fourier transform lens, so as to produce a two-dimensional Fourier transform of the Bragg cell. In the transform plane there is provided a frequency display in the horizontal (parallel to the direction of travel of acoustic waves in the Bragg cell) direction and an angle of arrival (azimuth angle) display in the vertical direction. Multiple radiation sources at different locations may be processed independently through superposition.

In accordance with a second embodiment of the present invention, the multi-channel two-dimensional modulator may be used to process monostatic or bistatic radar signals In this embodiment of the invention one processing dimension represents angle-of-arrival, as in the first embodiment, whereas the second processing dimension is employed for time compression of large time-bandwidth product pulse waveforms. As in the first embodiment, the outputs of the phased array antenna elements drive the respective transducers of the multi-channel Bragg cell. Also, as in the first embodiment, a downstream Fourier transform lens produces a two-dimensional Fourier transform of the Bragg cell Pulse compression is achieved by optically multiplying the Bragg transform image by a filter which is matched to the large time-bandwidth product pulse waveform and which is disposed at the Fourier transform plane of the lens A second Fourier transform/imaging lens combination then provides at an optical output plane the product of the filter by the transform of the Bragg cell. At the output plane, azimuth information is displayed in the vertical direction, while in the horizontal direction a linear photodetector array is used to determine the time at which correlation occurs. Since each photodetector corresponds to a particular azimuth angle, its output is indicative of target range at that angle.

BRIEF DESCRIPTION OF THE DRAWINGS

FIG. 7 is a diagram for illustrating a comparison between conventional bistatic radar coverage and that using the two-dimensional optical processor FIG. 5; and FIG. 8 shows an optical system for constructing the matched filter 51 of the processor of FIG. 5

DETAILED DESCRIPTION

As described briefly above, in accordance with the present invention there is provided an optical processing scheme employing a multi-channel Bragg cell that makes it possible to carry out two-dimensional signal storage/modulation within the cell without the need to correct for acoustic spreading within the cell. Pursuant to the present invention, advantage is taken of the properties of a certain class of signals that makes correction unnecessary. In accordance with the present invention, a multi-channel Bragg cell can be used to execute two-dimensional optical processing of phased array antenna signals. Respective embodiments of the invention directed to emitter field sorting and radar processing are described individually below.

EMITTER FIELD SORTING

Figure 1:
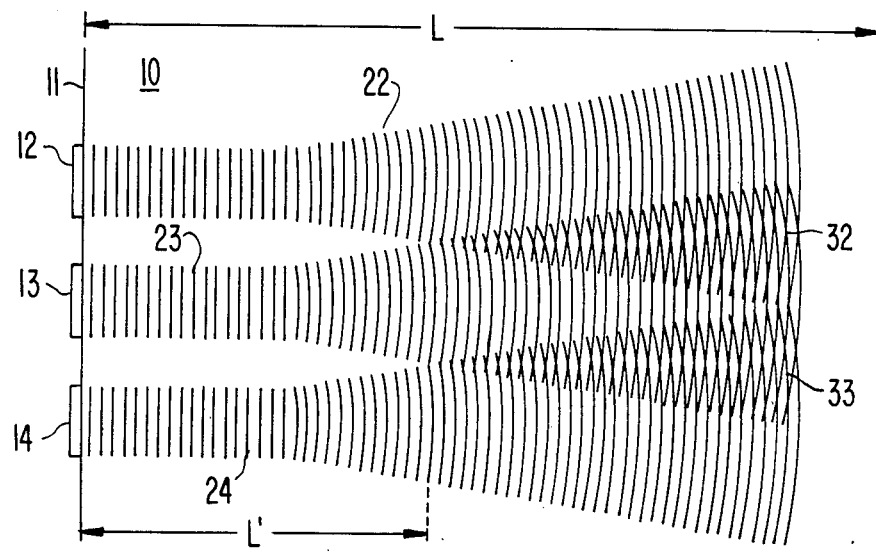
FIG. 1 is a diagrammatic illustration of the spreading phenomenon of a plurality of acoustic waves launched into the bulk of a multi-channel Bragg cell.
Figure 2:
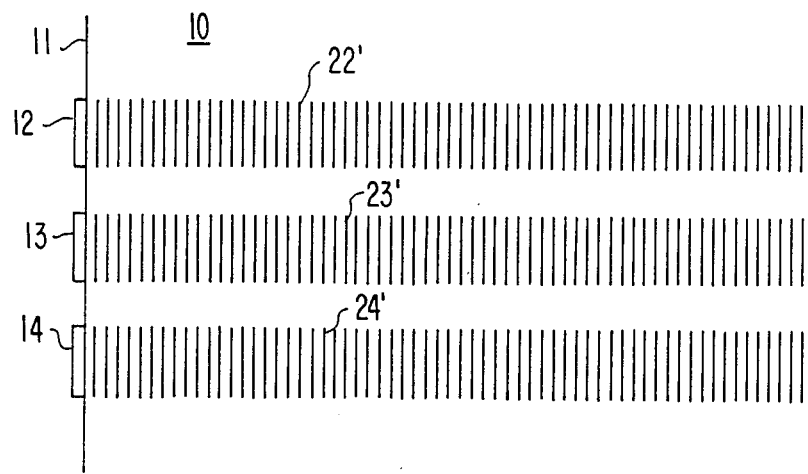
FIG. 2 is a diagrammatic illustration of the effect of correcting for the spreading phenomenon in the multi-channel Bragg cell of FIG. 1.
Figure 3:
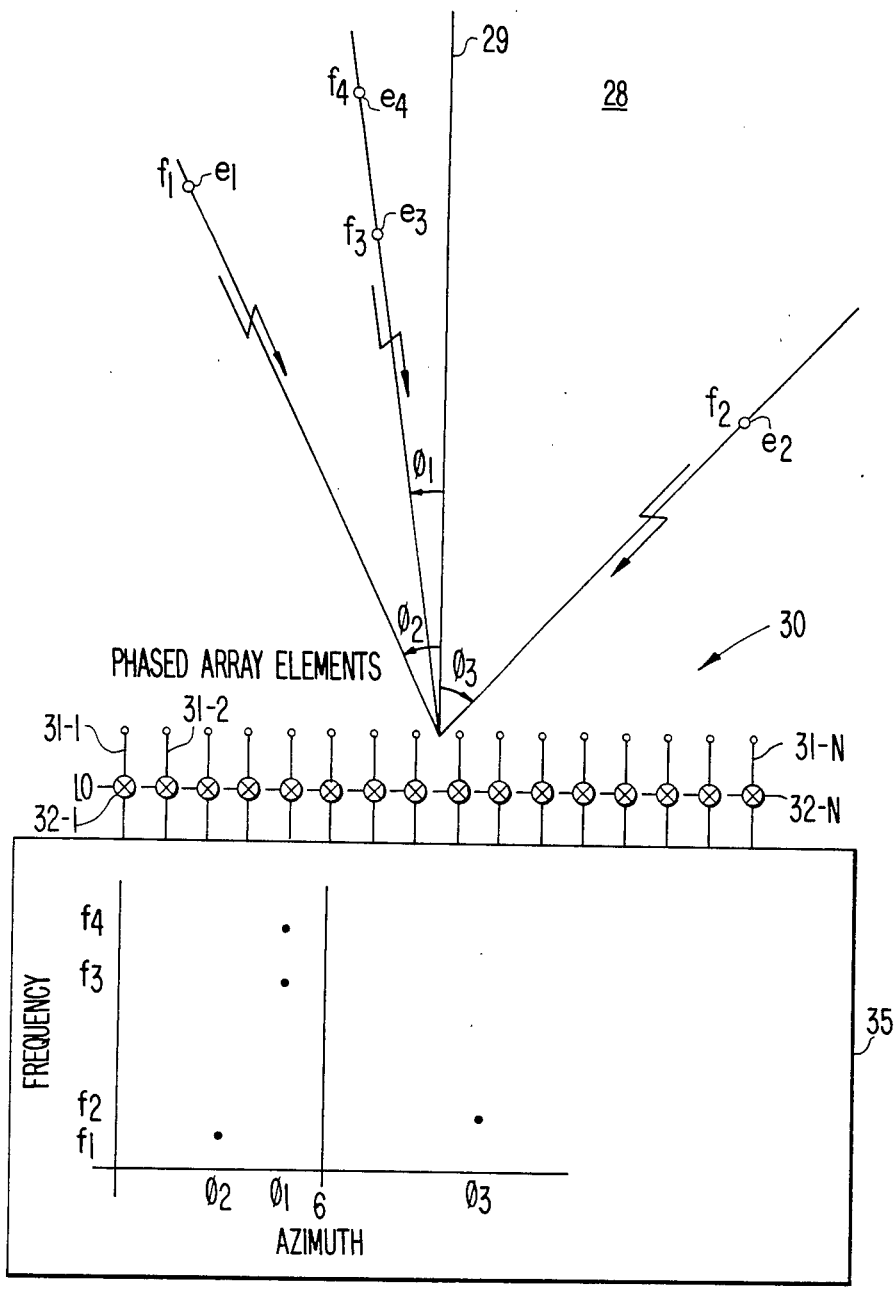
FIG. 3 shows a phased array antenna receiving a plurality of signals from respective emitters in a monitored geographical area.

In accordance with a first embodiment of the present invention the signals to be processed are derived from a phased array antenna system that is monitoring a prescribed geographic area for the presence of radiation sources (emitters); the object is to sort the emitters by frequency and angle of arrival of the impinging signal. FIG. 3 shows an emitter field 28 in which are propagating a plurality of incoming signals $f_1, f_2, f_3, f_4$ at respective angles of arrival relative to the boresight 29 of a phased array antenna 30 comprised of a plurality of antenna elements 31-1...31-N. Each antenna element 31-1 .31-N is shown coupled to a respective mixer 32-1 ... 32-N to which a frequency-shifting local oscillator signal is coupled. The local oscillator signal serves to shift the outputs of the phased array about the center frequency of the Bragg cell of the optical signal processor. As a practical example this center frequency may be on the order of 400 MHz. The outputs of the mixers represent the signals to be processed by the two-dimensional multi-channel Bragg cell configuration of the present invention, shown as processor block 35 in FIG. 3 In terms of a practical example, phased array 30 may be considered to contain a number N=128 elements. If the spacing between elements of approximately equal to $\lambda/2$, where $\lambda$ is the wavelength of the receiving array, then the field of view of array 30 may be on the order of 120 degrees with an angular resolution of approximately one degree After suitable amplification and frequency shifting (by the action of the local oscillator and mixers 32-1...32-N) to the center frequency of the Bragg cell to be employed by processor 35, the output of each element 31-1...31-N of phased array 30 is used to drive one channel of a multi-channel Bragg cell 41 shown as part of the optical processor 35 illustrated in FIG. 4. The channels of the Bragg cell are formed within the bulk by the launching of acoustic waves from respective transducers 43-1...43-N, disposed on face 44 of the cell. In the present example the time-bandwidth product is 400.

The outputs of the antenna array (subject to the above-mentioned amplification and frequency shift) are coupled to transducer 43-1...43-N so as to create adjacent acoustic wave signal signatures in the bulk 41. An incoming light beam 42 incident on cell 41 is spatially modulated by the respective acoustic signatures (representative of the outputs of the phased array) and propagates to Fourier transform lens 45 Lens 45 produces a two-dimensional Fourier transform of the Bragg cell in a downstream transform plane 46. The vertical axis 47 of plane 46 represents the angle of arrival $\phi$ of an emitter signal, while, the horizontal axis 48 represents the frequency of a received signal In the example shown in FIGS. 3 and 4, there are, four emitter signals at frequencies $f_1$, $f_2$, $f_3$ and $f_4$ from respective emitters $e_1$, $e_2$, $e_3$, and $e_4$ impinging upon array 30 Emitter signal $f_1$ is shown as having an angle of incidence $\phi_2$ relative to boresight 29. Emitter signal $f_2$ has an angle of arrival $\phi_3$, while emitter signals $f_3$ and $f_4$ impinge upon the array at an angle $\phi_1$. The two-dimensional sorting of emitters in terms of frequency and angle of arrival is depicted graphically in block 35 of FIG. 3 and in transform plane 46 of FIG. 4.

Figure 4:
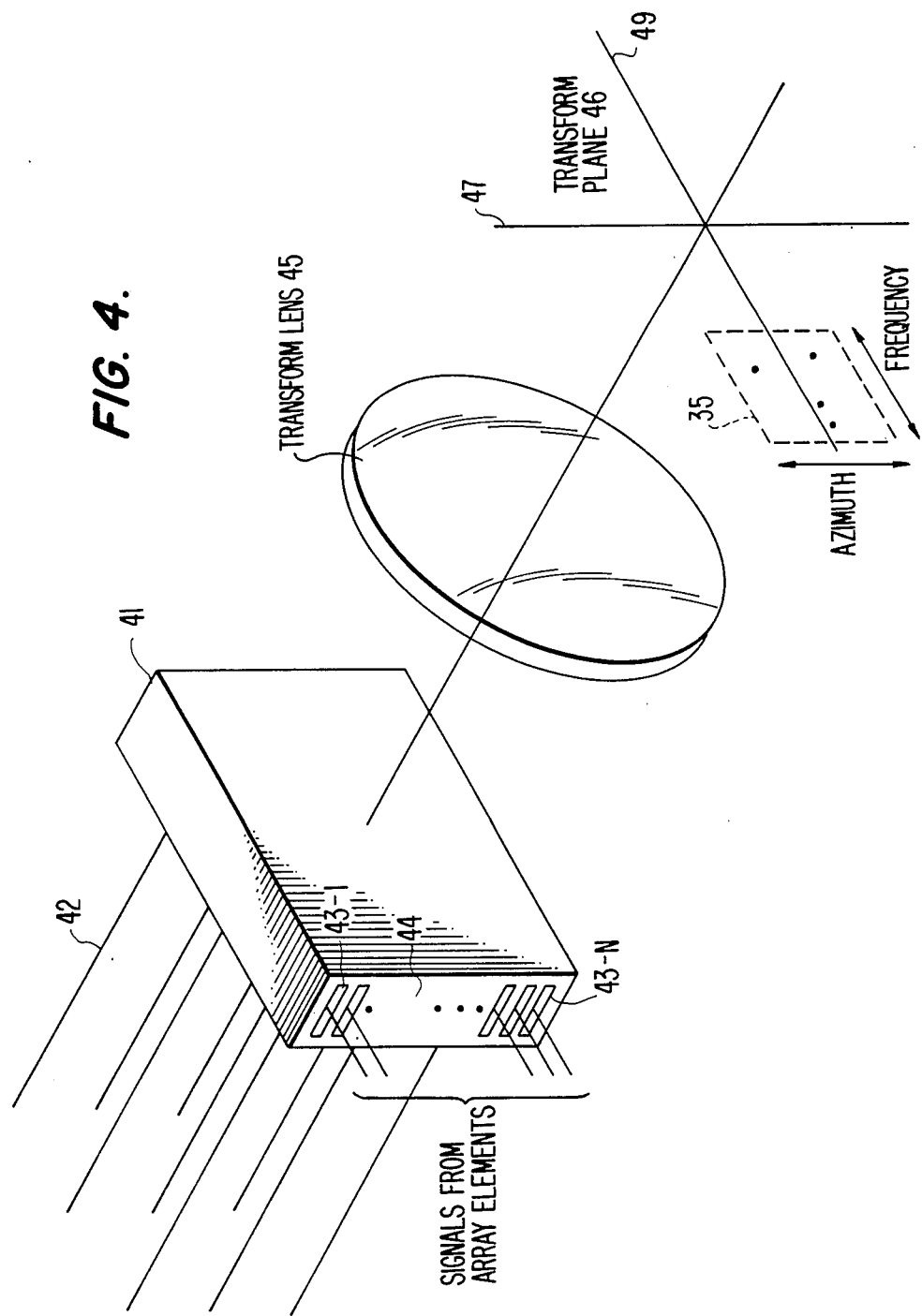
FIG. 4 shows a two-dimensional optical processor employing a multi-channel Bragg cell for emitter field sorting.

That the multi-channel Bragg cell emitter field sorting processor of FIGS. 3 and 4 requires no compensation for acoustic spreading within Bragg cell 41 may be understood by considering the array of transducers 43-1...43-N to form a composite transducer having an overall width N times the channel-to-channel spacing. For a CW emitter, e.g. frequencies $f_1$, $f_2$, $f_3$, $f_4$, the frequency received by each element of array 30, and consequently coupled to transducers 43-1 ... 43-N of Bragg cell 41, has an incremental linear phase shift associated components, corresponding to respective "phase-steps" in the incoming signal, and because the duty cycle of the transducer is less than 100 per cent, grating lobes are created in the system's response. However, these lobes are not an artifact of the optical processing but are associated with the discrete sampling nature of phased arrays If the phase front of an incident wave is sampled at a sufficiently high rate ($\lambda/2$ for no angle ambiguity), the lobes do not introduce any ambiguity in the angle of arrival.

In the example shown in FIG. 3 and 4, where there are a plurality of emitters operating in the field of view of the array at different angles of arrival, the processor operates in accordance with the above principles for each frequency and effectively "sorts" the multiple signals for display in transform plane 46 by superposition In addition to the example presented here, the present invention is also applicable to those phased arrays which deliberately under sample the antenna outputs and use nonisotropic antenna elements to increase resolution and gain. Also, while phased arrays normally operate over small fractional bandwidths, the processor according to the present invention is equally proficient at operating on broadband arrays (up to 67 percent bandwidth) using a simple geometric correction of the output plane. Finally, the processing may be adopted to non-uniform linear arrays by a corresponding non-uniform placement of the transducers.

As will be appreciated from the foregoing description of the application of the invention as an emitter field sorter, the multi-channel Bragg cell processor provides the capability of sorting all emitters in the field of view of the antenna array by angle-of-arrival and frequency, and thereby greatly increases the speed that complex emitter fields can be analyzed for signals of interest, with the capability of 100 percent probability of intercept of signals in the analysis bandwidth. This dual sorting capability can greatly increase the effectiveness of triangulation systems using two or more such arrays in dense emitter fields In addition, the high gain processing allows detection of very weak signals and facilitates detection of spread spectrum emitters.

For this purpose, at the transform plane 46, there is provided a two-dimensional array of photodectors associated with respective increments of angle-of-arrival and frequency. The output of each photodetector is coupled to a respective latchable threshold comparator If the instantaneous intensity of the optical input of a photodetector exceeds a prescribed threshold level, the output of the associated comparator changes state, to indicate that an emission has occurred within the field of view of the phased array. As a result, emitters that have low duty cycles over the output scanning period may be detected Once detected the latched comparators are reset. This latched emitter sorter can greatly increase the effectiveness of the processor for detecting pulsed emitters such as radar and frequency-hopped spread spectrum emitters To detect low-level signals using radiometric techniques, the photodetectors may be integrating detectors to perform integrating spectral analysis. Both of these detection techniques serve to reduce the post-processing data rates.

PROCESSING OF RADAR SIGNALS (MONOSTATIC OR BISTATIC)

In accordance with a second embodiment of the invention, a multi-channel Bragg cell may be used to effect two-dimensional optical processing of monostatic or bistatic radar signals. In this embodiment, as in the first, one dimension represents angle-of-arrival of the received signal The second dimension provides time compression of large time-bandwidth product pulse waveforms.

Figure 5:
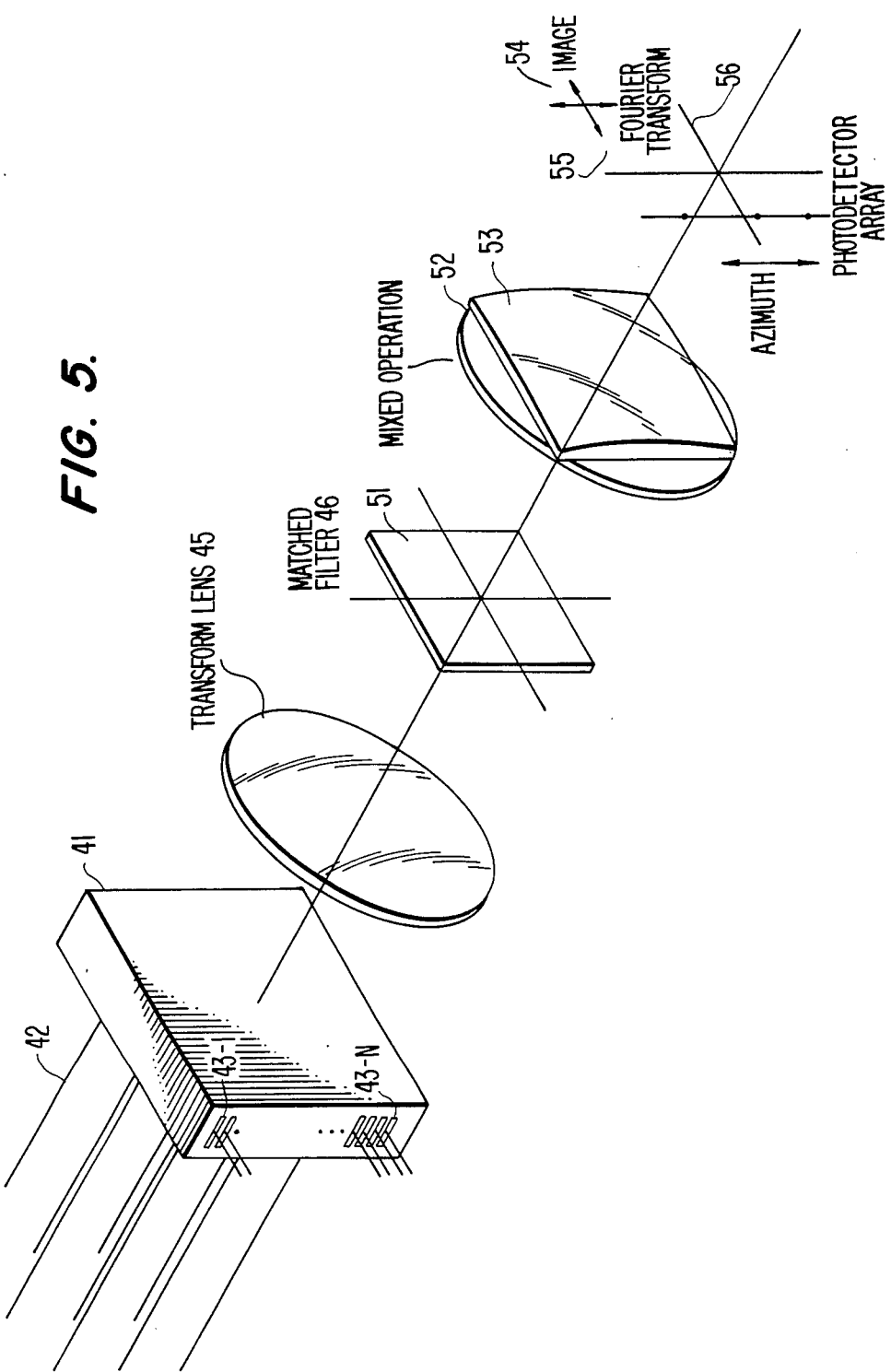
FIG. 5 shows the configuration of a two-dimensional optical processor for processing monostatic or bistatic radar signals.

FIG. 5 shows the configuration of the optical processor including the same components as the embodiment of FIG. 4 and, in addition further processing elements downstream of the transform lens 45. More particularly, disposed in the transform plane 46 of Fourier transform lens 45 is a matched filter 51 matched to the large time-bandwidth signal that is applied to transducer 43-1...43-N as supplied at the outputs of the phased array. The construction of filter 51 will be described in detail below. Downstream of matched filter 51 are Fourier transform lens 52 and imaging lens 53 for forming, at output plane 54, a two-dimensional image of both angle-of-arrival and time-of-arrival information. Specifically, at plane 54, azimuth (angle-of-arrival) information is imaged in the vertical direction, while, in the horizontal direction, time of correlation (time-of-arrival) is imaged A suitable linear photodetector array may be positioned at plane 54 for providing electrical signals representative of azimuth and target range. Namely, since the position of each photodetector in the vertical direction 55 corresponds to a particular angle, its output provides target information, at that angle.

MONOSTATIC PHASED ARRAY RADAR PROCESSOR

Figure 6:
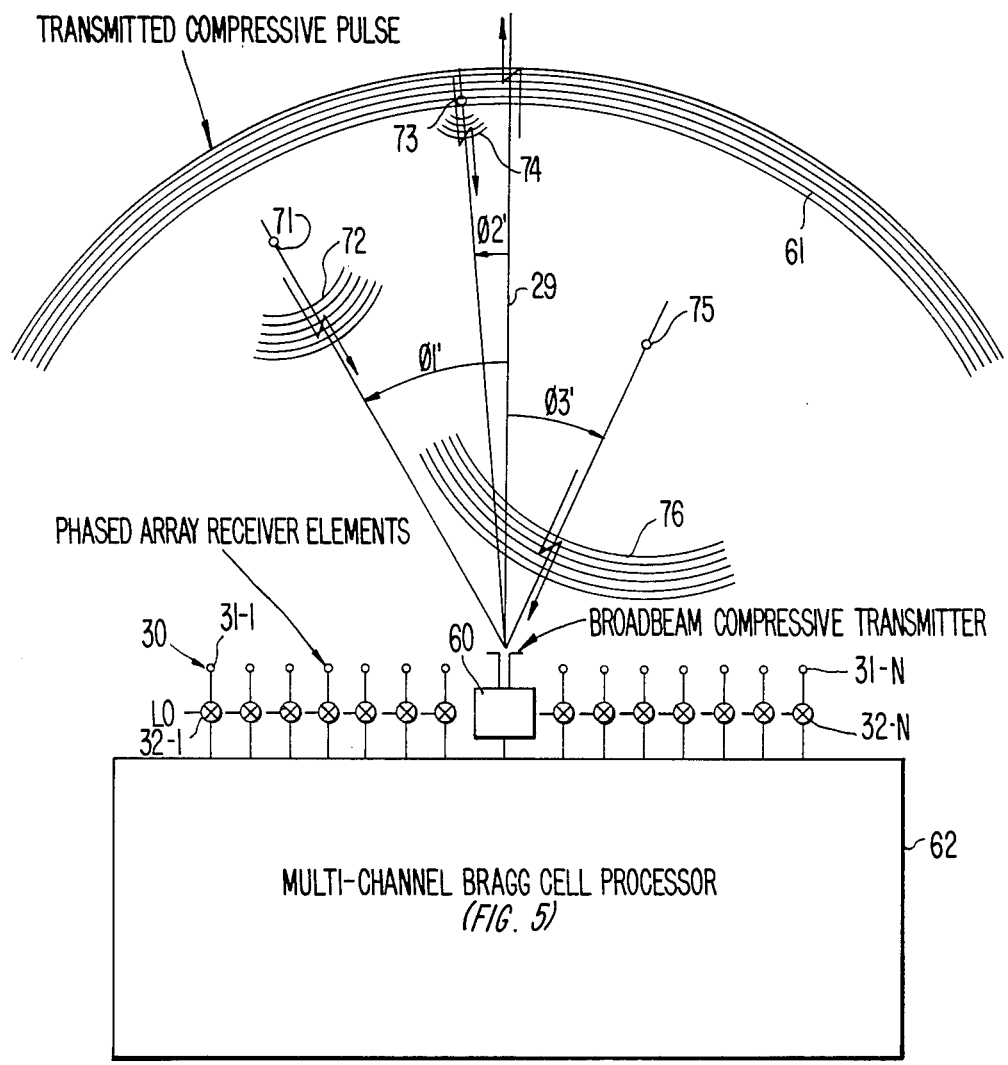
FIG. 6 shows a monostatic phased array radar processor.

FIG. 6 shows an exemplary configuration of a monostatic phased array radar system which employs the multi-channel Bragg cell processor of FIG. 5. Specifically, from a single broadbeam high power transmitter 60, a compressive RF pulse 61 is transmitted out over a prescribed area of interest. A phased array antenna array 30 is shown co-located with the transmitter 60, and is operated in a receive only mode. Reflector sites 71, 73 and 75 that are situated in the field of view of the array 30 and transmitter 60 return reflected wavefronts 72, 74 and 76 respectively at angles-of-arrival $\phi_1 40$, $\phi_2'$ and $\phi_3'$, as shown. The frequency-shifted and amplified outputs of the antenna elements 31-1...31-N of phased array 30 are coupled to the transducer 43-1 ..43-N of the two-dimensional Bragg cell processor 62 which sorts wavefronts 72, 74 and 76 by angle of arrival and range, as described above with reference to FIG. 5. A particular advantage is the ability to use a receive only array and a broadbeam transmitter

BISTATIC PHASED ARRAY RADAR PROCESSOR

FIG. 7 illustrates a comparison of conventional bistatic processing coverage and that afforded in accordance with the phased array multi-channel two-dimensional optical processor of the present invention. As shown in FIG. 7, from a scanning phased array 30 a conventional scanned return or receive beam 82 having a narrow beamwidth $\theta_C$ scans a field of view encompassing a transmit beam 81 from a source not shown. Since the area of overlap 83 of beams 81 and 82 is significantly limited in this conventional approach, many of the returns from transmit beam 81 may be lost as they are not seen by beam 82. In accordance with the present invention, on the other hand it is possible to process the entire field of view 84 of array 30 having an effective beamwidth $\theta_B$ with the optical processor of FIG. 5, since the two-dimensional Bragg cell processor is capable of handling multiple returns simultaneously so that returns that would otherwise be lost by the narrow beamwidth conventional scanning approach such as by scanned beam 82, are not missed.

As pointed out above, in the radar processor of FIG. 5 a matched filter 51 is required for executing the time-compression function To produce this matched filter an optical processor of the type similar to the above-mentioned Vanderlugt articles may be employed More particularly, as shown in FIG. 8, a photographic plate 102 that is to be used as the filter 51 is disposed in the Fourier transform plane of a Fourier lens 101. Like the optical processor shown in FIGS. 4 and 5 lens 101 forms in plane 102 the Fourier transform of an upstream multi-channel Bragg cell 95. The Bragg cell 95 itself has one of its channels (preferably the center channel) driven by the compressive waveform to be detected (the transmitted radar pulse), so that the corresponding acoustic wave launched in response to the input compressive radar pulse waveform occupies the aperture of the Bragg cell The Bragg cell is illuminated by a collimated source of light, which may be produced by an upstream point source (e.g. laser) 91, and, collimating lens 92, each of which, together with the other components of the processor, is disposed along optical axis 100. A focussing lens 93 serves to create a point source 94 above and in the plane of the multi-channel Bragg cell 95. Source 91 is pulsed, by which the acoustic wave in the Bragg cell 95 corresponding to the compressive wave applied to the single (center) channel of the cell is illuminated onto lens 101, whereby a Fourier transform of cell 95 is recorded on photographic plate 102. After being developed, photographic plate 102 now contains the matched filter to be employed in the processor of FIG. 5 Rather than use a separate processor, the same components shown in FIG. 8 for generating the matched filter can be used, with the addition of downstream transform and imaging lenses 103 and 104 respectively, which form the resultant processed image on output plane 105.

With the developed photographic plate 102 now reinserted into the system as a matched filter (corresponding to matched filter 51 in FIG. 5), lens 93 is removed so as to prevent the formation of point source 94. All the channels of Bragg cell 95 are driven by the respective outputs of phased array 30 and Bragg cell 95 is continuously illuminated (not pulsed) by source 91 and lens 92, with the desired resultant output obtained at output plane 105 In the course of providing a pulse compression multiplier, matched filter 51 inherently compensates for acoustic spreading in the channels.

As will be appreciated from the foregoing description, the optical processor of the present invention is capable of providing two-dimensional optical processing of signals having prescribed high correlation properties (e.g. phased array and emitter sorting), without the need for correction for acoustic spreading when using a multi channel Bragg cell. While the configurations shown and described are evenly spaced, the present invention is equally applicable to nonuniformly distributed signal inputs. In this application, the transducers on the Bragg cell are spaced nonuniformly corresponding to the array.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. For use with a signal receiving apparatus wherein respective elements of the apparatus provide output signals representative of a response thereto of one or more waveforms having high correlation properties received thereby, an arrangement for optically processing the output signals produced by said elements comprising:

a multi-channel Bragg cell to respective input transducers of which signals corresponding to the output signals provided by the respective elements of said apparatus are applied, thereby causing acoustic waves associated with each of said channels to be launched into and propagated through the Bragg cell as a composite acoustic wave for which there is no debilitating effect of spreading across the length of travel of the wave in the cell;

means for illuminating said multi-channel Bragg cell with an incident light beam, whereby said light beam is modulated two-dimensionally by information contained in the composite acoustic wave of the multiple channels of the Bragg cell; and means for forming a Fourier transform of the modulation of said light beam by said multi-channel Bragg cell in a prescribed Fourier transform plane, whereby there is formed in said plane a two-dimensional representation of prescribed characteristics of said one or more waveforms.

2. An arrangement according to claim 1, wherein the distribution of transducers on said Bragg cell, through the energization of which by said output signals said acoustic waves are launched, corresponds to the distribution of the respective elements of said signal receiving apparatus.

3. An arrangement according to claim 1, wherein said apparatus comprises a phased array receiving apparatus and wherein said one or more waveforms correspond to waveforms emitted from one or more sources in the field of view of said phased array, and at said Fourier transform plane said Fourier transform forming means produces a two-dimensional image, one dimension of which corresponds to the frequency of the waveform emitted by an emitter and the other dimension of which corresponds to the angle of arrival of the waveform from said emitter at said phased array.

4. An arrangement according to claim 3, wherein said Fourier transform forming means comprises a Fourier transform lens disposed between said multi-channel Bragg cell and an output image plane, corresponding to the Fourier transform plane of said lens.

5. For use with a phased array pulsed radar signal receiving apparatus wherein respective antenna elements of the phased array provide output signals representative of radar returns of compressive waveforms transmitted by a pulsed radar signal source and received by the array after reflection off one or more objects within a field of view of the array, an arrangement for optically processing the output signals produced by said array comprising:
- a multi-channel Bragg cell to respective input transducers of which signals provided by the respective antenna elements of the phased array are applied, thereby causing acoustic waves associated with each of the channels of the Bragg cell to be launched into and propagated through the Bragg cell;
- means for illuminating said multi channel Bragg cell with an incident light beam, whereby said light beam is modulated two-dimensionally by information contained in the acoustic waves of the multiple channels of the Bragg cell;
- means for forming a two-dimensional Fourier transform of the modulation of said light beam by said multi-channel Bragg cell in a Fourier transform plane;
- a matched filter corresponding to compressive characteristics of said waveforms disposed in said Fourier transform plane; and
- means for forming in a first dimension of an output plane a Fourier transform of a effect of said matched filter on the Fourier transform of said Bragg cell and in a second dimension an image of the effect of said matched filter on said Fourier transform, whereby at said output plane there is formed a two-dimensional representation of prescribed characteristics of said radar returns.

6. An arrangement according to claim 5, wherein said first dimension corresponds to the angle of arrival of a radar return at said phased array and said second dimension corresponds to the range from the phased array of the object from which the radar return was reflected.

7. An arrangement according to claim 6, wherein said Fourier transform forming means comprises a Fourier transform lens disposed between said multi-channel Bragg cell and the plane in which said matched filter is disposed.

8. An arrangement according to claim 7, wherein said matched filter is comprised of a photographic plate that has been placed unexposed in the Fourier transform plane of said Fourier transform lens while one channel of said Bragg cell was driven by a signal corresponding to the transmitted compressed radar pulse waveform and the Bragg cell was illuminated by a point source of light, and then developed to produce compression matching characteristics of said matched filter.

9. An arrangement according to claim 6, wherein said pulsed radar source is disposed adjacent to said phased array so as to transmit an outgoing radar pulse waveform over the field of view of said phased array at which radar returns form said source are received, thereby forming a monostatic radar apparatus.

10. An arrangement according to claim 6, wherein said pulsed radar source is disposed apart from said phased array, so as to transmit an outgoing radar pulse waveform that is intercepted by the field of view of said phased array at which radar returns from said spaced apart source are received, thereby forming a bistatic radar apparatus.

11. An arrangement according to claim 5, wherein the distribution of transducers on said Bragg cell, through the energization of which by said output signals and acoustic waves are launched, corresponds to the distribution of the respective elements of said phased array.

12. For use with a signal receiving apparatus wherein respective elements of a distribution of elements of the apparatus provided output signals representative of a response thereto of one or more waveforms received by the apparatus, a method of optically processing output signals produced by said elements in response to receipt thereby of one or more waveforms having high correlation properties emanating from one or more respective emitters in a field of view of said apparatus comprising the steps of:
- (a) driving a distribution of transducers of a multi-channel Bragg cell, corresponding to the distribution of the respective elements of said signal receiving apparatus, with signals corresponding to output signals produced by said respective elements, and thereby causing acoustic waves associated with each of the channels of said Bragg cell to be launched into and propagated through the Bragg cell as a composite acoustic wave for which there is no debilitating effect of spreading across the length of travel of the wave in the Bragg cell;
- (b) illuminating said multi-channel Bragg cell with a light beam, so as to cause said light beam to be modulated two-dimensionally by information contained in the composite acoustic wave of the Bragg cell; and
- (c) forming a Fourier transform of the modulation of said light beam by said Bragg cell so as to provide a two-dimensional representation of prescribed characteristics of said one or more waveforms.

13. An arrangement according to claim 12, signal receiving apparatus comprises a phased array receiving apparatus and wherein said one or more waveforms correspond to waveforms emitted from one or more emitters in the field of view of said phased array and, as said Fourier transform, step (c) produces a two-dimensional image, one dimension of which corresponds to the frequency of the waveform emitted by an emitter and the other dimension of which corresponds to the angle of arrival of the waveform from said emitter at said phased array.

14. For use with a phased array pulsed radar signal receiving apparatus wherein respective antenna elements of the phased array provide output signals representative of radar returns of compressive waveforms transmitted by a pulsed radar signal source and received by the array after reflection off one or more objects within a field of view of the array, a method of optically processing the output signals produced by said array comprising the steps of:

(a) driving respective input transducers of a multi-channel Bragg cell with signals provided by the respective antenna elements of the phased array, thereby causing acoustic waves associated with each of the channels of the Bragg cell to be launched into and propagated through the Bragg cell;

(b) illuminating said multi-channel Bragg cell with an incident light beam, whereby said light beam is modulated two-dimensionally by information contained in the acoustic waves of the multiple channels of the Bragg cell;

(c) forming a two-dimensional Fourier transform of the modulation of said light beam by said multi-channel Bragg cell in a Fourier transform plane;

(d) disposing a matched filter corresponding to compressive characteristics of said waveforms disposed in said Fourier transform plane; and (e) forming in a first dimension of an output plane a Fourier transform of a effect of said matched filter on the Fourier transform of said Bragg cell and in a second dimension an image of the effect of said matched filter on said Fourier transform, whereby at said output plane there is formed a two-dimensional representation of prescribed characteristics of said radar returns.

15. A method according to claim 13, wherein said first dimension corresponds to the angle of arrival of a radar return at said phased array and said second dimension corresponds to the range from the phased array of the object from which the radar return was reflected.

16. A method according to claim 15, wherein said matched filter is comprised of a photographic plate that has been placed unexposed in the Fourier transform plane of said Fourier transform lens while one channel of said Bragg cell was driven by a signal corresponding to the transmitted compressed radar pulse waveform and the Bragg cell was illuminated by a point source of light, and then developed to produce compression matching characteristics of said matched filter.

17. A method according to claim 14, wherein said pulsed radar source is disposed adjacent to said phased array so as to transmit an outgoing radar pulse waveform over the field of view of said phased array at which radar returns from said source are received, thereby forming a monostatic radar apparatus.

18. A method according to claim 13, wherein said pulsed radar source is disposed apart from said phased array, so as to transmit an outgoing radar pulse waveform that is intercepted by the field of view of said phased array at which radar returns from said spaced apart source are received, thereby forming a bistatic radar apparatus.

19. A method according to claim 14, wherein the distribution of transducers on said Bragg cell, through the energization of which by said output signals said acoustic waves are launched, corresponds to the distribution of the respective elements of said phased array.

* * * * *